March 1, 1932.  W. P. FITZGERALD  1,847,605
LICENSE TAG SECURING DEVICE
Filed Feb. 25, 1931  2 Sheets-Sheet 1
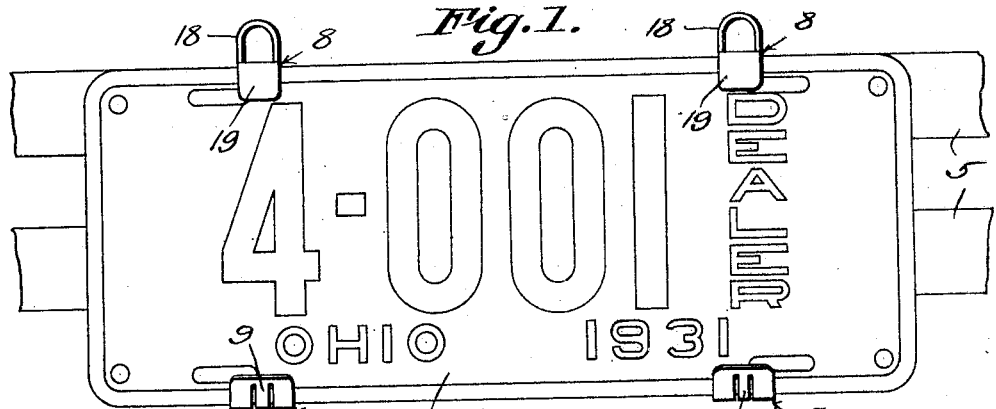
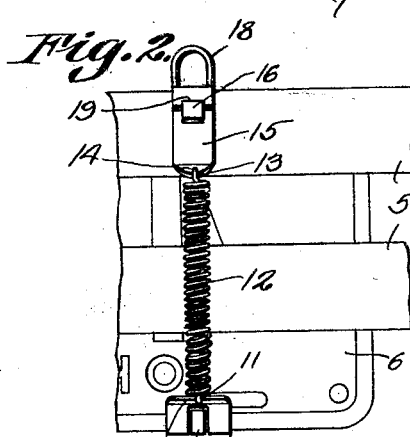
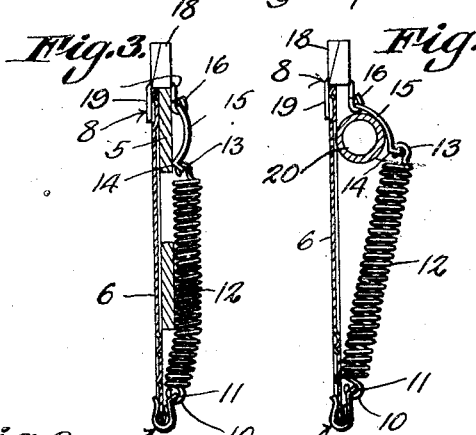
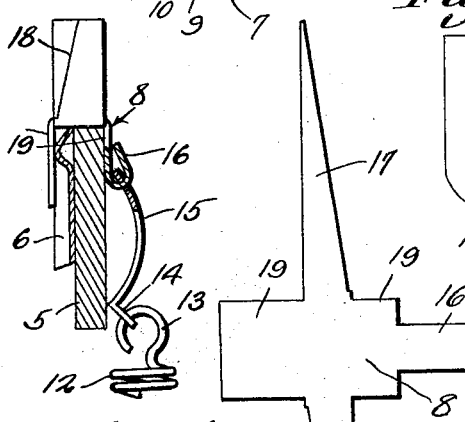
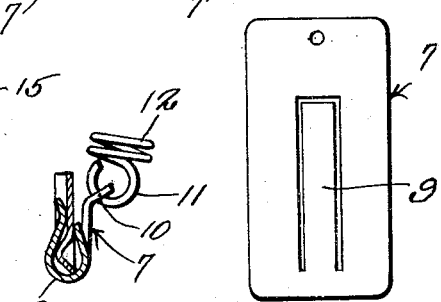
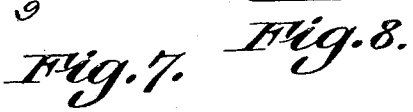
Inventor
W. P. Fitzgerald
By C. A. Snow & Co.
Attorneys.

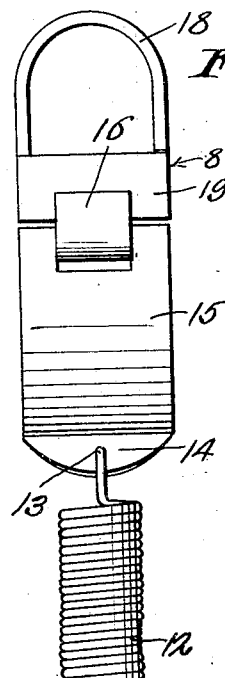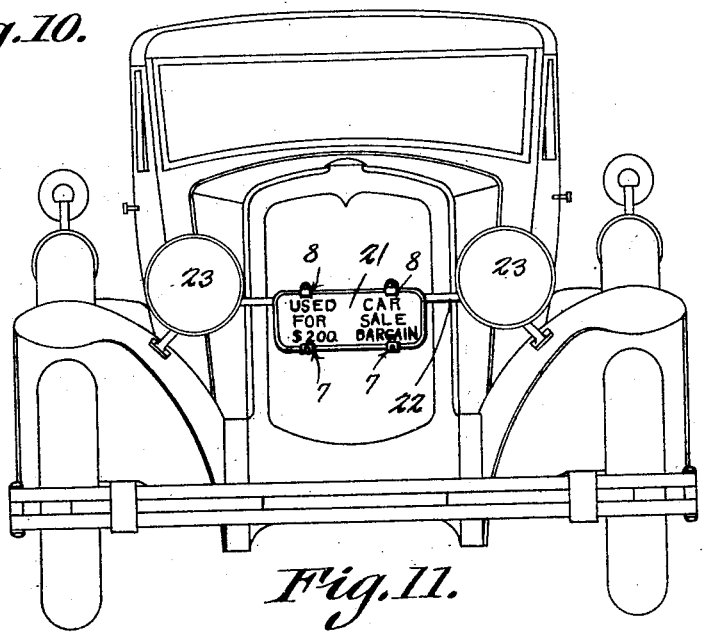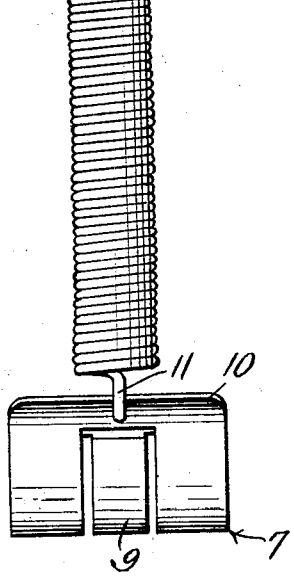

Patented Mar. 1, 1932

1,847,605

UNITED STATES PATENT OFFICE

WILLIAM PRESTON FITZGERALD, OF PRINCESS ANNE, MARYLAND

LICENSE TAG SECURING DEVICE

Application filed February 25, 1931. Serial No. 518,271.

This invention relates to license tag securing devices designed primarily for use by automobile dealers, an important object of the invention being to provide a tag securing device of the removable type, so constructed that a license tag may be readily and easily removed or replaced.

Another important object of the invention is to provide a securing device of this character having adjustable means for gripping a license bracket, bumper, lamp brace rod, or similar supporting member on which the tag is to be mounted.

A further object of the invention is to provide means for holding the securing device on a tag, in such a way as to insure against displacement of the securing device, when the tag is not in use.

A still further object of the invention is to provide a securing device which may be adjusted longitudinally of the license tag with which it is used, thereby adapting the securing device for use in connection with license tags of various lengths and widths.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is an elevational view illustrating a license tag secured to a motor vehicle bumper, by means of a securing device constructed in accordance with the invention.

Figure 2 is a fragmental rear elevational view thereof.

Figure 3 is a vertical sectional view through the bumper and tag.

Figure 4 is a vertical sectional view illustrating the securing device mounted on a lamp connecting rod.

Figure 5 is a fragmental sectional view illustrating the securing device used in connection with a license tag bracket.

Figure 6 is a view illustrating a blank stamped from a length of sheet metal, and illustrating one of the finger pieces of the securing device.

Figure 7 is a sectional view illustrating the lower clamp of a securing device.

Figure 8 is a view of a blank from which the lower clamps of a securing device, are constructed.

Figure 9 is a view of the pivoted plate forming a part of the clamp.

Figure 10 is an enlarged elevational view of a securing device constructed in accordance with the invention.

Figure 11 is an elevational view illustrating the device used in securing a "for sale" sign on a motor vehicle.

Figure 12 is a view illustrating the device for use in securing a price tag on a chair.

Referring to the drawings in detail, the reference character 5 designates a bumper, to which a license tag, such as indicated by the reference character 6, is secured. The securing device, forming the essence of the present invention, embodies a lower clamp 7 and an upper hook member 8, the lower clamp being stamped from a length of sheet metal material in such a way as to provide a body portion and a tongue 9, the body portion and tongue being curved to hook over the lower edge of a license tag, in a manner as shown by the drawings. The tongue is of such a construction, that it will frictionally engage the license tag, to hold the clamp 7 against displacement, but at the same time permit the clamp 7 to be adjusted longitudinally of the tag, thereby rendering it possible to attach license tags to supports of various lengths. As shown, one end of the clamp 7 extends outwardly as at 10, where it is provided with an opening to receive the hook 11, formed at one end of the coiled spring 12, the opposite end of the coiled spring being formed into a hook 13, that hooks into an opening formed in the outwardly extended portion 14, of the plate 15, forming a part of the upper hook member 8.

This plate 15, is slightly curved so that it will conform in a general way to the curvatures of rods, on which the license tag is to be supported. At the upper end of the plate 15, is an elongated opening designed to accommodate the tongue 16 that forms a part of the upper hook member, so that the plate is pivotally connected with the main or body portion of the upper hook member.

In forming the body portion of the upper hook member, the extensions 17 of the blank are moved towards each other, where they are brought into engagement to provide a loop or finger piece 18, to receive the finger of the operator, to permit the upper hook member to be pulled against the tension of the spring 12, to position the upper hook member over the upper edge of a license tag.

Downwardly extended flanges 19 are formed at opposite sides of the body portion of the upper hook member, the space between the flanges being substantially wide, so that slight pivotal movement of the hook member will be permitted when the securing device is positioned over a rod, to the end that the hook member will automatically adjust itself.

As shown by Figure 4 of the drawings, the securing device is employed in securing a license tag to a lamp connecting rod, whereupon the curved plate 15 is positioned against the rod, the rod being indicated by the reference character 19. Thus it will be obvious that the spring 12 will act to draw the lower end of the curved plate downwardly, gripping the rod 19 between the plate and rear surface of the license tag.

When the license tag securing device is used for securing a tag to a bumper, such as shown by Figure 3, the upper section of the bumper is firmly held between the license tag and rear flange of the upper hook member. Due to this construction, it will be obvious that the securing device may be readily and easily positioned, and may be used in securing a license tag to rods of various sizes, without making changes in the construction of the securing device.

In Figure 11 the securing device is illustrated as used in connection with a "for sale" tag indicated by the reference character 21, the same being shown as secured to the connecting rod 22 employed in connecting the lamps 23 of the vehicle.

Figure 12 illustrates a "for sale" tag 24 secured to a chair, by the securing device forming the subject matter of this invention, the securing device embracing portions of the back 25 of the chair. To position the securing device, it is only necessary to position the clamp 7 over the lower edge of the plate or tag with which the securing device is used. The tag or plate is now placed against the support to which the plate is to be secured, and the upper hook member of the securing device is pulled upwardly to stretch the spring 12, whereupon the hook member is allowed to move downwardly over the tag or article secured by the device, clamping the support between the securing device and tag in a manner as shown by Figure 4.

While I have shown and described the device as used primarily for securing license plates, it is to be understood that it is within the scope of the invention to use the device for securing price tags to other articles such as furniture, license brackets or other supporting members, wherein it is necessary to removably support a tag or card.

I claim:

1. The combination with a license plate support, of a license tag holder comprising a lower license plate engaging member and an upper license plate engaging member, a coiled spring connected to the lower license plate engaging member, a plate pivotally connected with the upper license plate engaging member, and said spring being pivotally connected with the pivoted plate.

2. The combination with a license plate support, of a license tag holder comprising tag clamping members, a pivoted member secured to one of the tag clamping members, a spring connected with the pivoted member and the other of the tag clamping members, and said spring overlying the license plate support to tension the spring and draw the clamping members into close engagement with the license plate support.

3. The combination with a license plate support, a license tag holder comprising tag clamping members, a curved pivoted member connected with one of the tag clamping members, a coiled spring connected with the pivoted member, a tag clamping member at the end of the coiled spring, and said spring adapted to draw the curved pivoted member into engagement with a license tag support.

In testimony that I claim the foregoing as my own, I have hereto affixed my signature.

WILLIAM PRESTON FITZGERALD.